United States Patent [19]

Yajima et al.

[11] 4,164,528
[45] Aug. 14, 1979

[54] METHOD FOR PRODUCING METAL NITRIDE SINTERED MOLDINGS

[75] Inventors: Seishi Yajima; Josaburo Hayashi; Mamoru Omori; Hideo Kayano; Masaaki Hamano, all of Oharai, Japan

[73] Assignee: The Research Institute for Iron, Steel and Other Metals of the Tohoku University, Sendai, Japan

[21] Appl. No.: 730,881

[22] Filed: Oct. 8, 1976

[30] Foreign Application Priority Data

Oct. 18, 1975 [JP] Japan .................. 50/124878

[51] Int. Cl.² .............................. C04B 35/56
[52] U.S. Cl. ........................ 264/62; 106/44; 106/73.2; 264/63; 264/65; 264/134; 264/332
[58] Field of Search ............. 264/63, 65, 332, 134; 106/44, 73.2, 62

[56] References Cited

U.S. PATENT DOCUMENTS

| | | |
|---|---|---|
| 3,468,992 | 9/1969 | Lubotti et al. .................. 264/63 |
| 3,485,904 | 12/1969 | Ostrowski ..................... 264/63 |
| 3,749,591 | 7/1973 | Hider et al. ................... 264/63 |
| 3,819,786 | 6/1974 | May ............................ 264/63 |

FOREIGN PATENT DOCUMENTS

| | | |
|---|---|---|
| 724702 | 12/1965 | Canada ........................ 264/63 |
| 2236078 | 3/1974 | Fed. Rep. of Germany ...... 264/63 |
| 1054631 | 1/1967 | United Kingdom ............. 264/63 |

Primary Examiner—Robert F. White
Assistant Examiner—John A. Parrish
Attorney, Agent, or Firm—Ladas, Parry, Von Gehr, Goldsmith & Deschamps

[57] ABSTRACT

Metal nitride sintered moldings are produced by mixing metal nitride powders with an organosilicon compound or an organosilicon high molecular weight compound as a binder, molding the mixture into a desired shape and heating the formed molding under a non-oxidizing atmosphere to sinter the metal nitride powders.

7 Claims, 6 Drawing Figures

FIG_4

METHOD FOR PRODUCING METAL NITRIDE SINTERED MOLDINGS

The present invention relates to a method for producing metal nitride sintered moldings and more particularly a method for producing metal nitride sintered moldings by molding a mixture of metal nitride powders with a binder of an organosilicon compound or an organosilicon high molecular weight compound and heating the formed molding.

Among metal nitrides, $Si_3N_4$ and AlN have been particularly broadly used in view of the excellent properties at a high temperature and these metal nitride sintered moldings have been produced by the following processes.

(1) Production of $Si_3N_4$ sintered moldings.

In general, silicon powders are molded and the formed molding is heated in nitrogen gas or ammonium gas to concurrently cause nitridation reaction and sintering. However, $Si_3N_4$ is poor in the self sintering ability and the sintered molding obtained from $Si_3N_4$ alone by the conventional production process has a porosity of about 20% and has a low density of about 1.2–2.7 g/cm$^3$, which is far lower than the theoretical density of $Si_3N_4$ of 3.18 g/cm$^3$ and is noticeably oxidized at a temperature of about 1,200° C. However, a relatively novel process wherein MgO, $Al_2O_3$, $Y_2O_3$ and the like are added to $Si_3N_4$ powders and the mixture is kneaded, molded and then sintered, has been recently developed and dense $Si_3N_4$ sintered moldings having a high oxidation resistance have been obtained.

In particular, $Si_3N_4$ sintered molding referred to as "Sialon" which has a high density near the theoretical density has been recently obtained by adding several percent of $Al_2O_3$ or $Y_2O_3$ as a binder to $Si_3N_4$ powders through hot press process. However, it cannot be avoided in view of the production according to the above described various processes that impurities other than $Si_3N_4$, such as MgO, $Al_2O_3$, $Y_2O_3$ and the like are admixed.

(2) Production of AlN sintered molding.

In general, aluminum nitride powders are subjected to hot press or aluminum nitride alone is molded and sintered or aluminum nitride is added with aluminum powder and the mixture is molded and subjected to nitridation and sintered to form an aluminum nitride sintered molding. However, the process other than the hot press process cannot provide a satisfactorily dense sintered molding and the sintered molding obtained by the process other than the hot press process needs a treating condition of a high temperature of about 1,700°–2,000° C. and the formed AlN sintered molding is weak in the strength. Even if the sintered molding having a relative density of about 98% can be obtained in the hot press process, the strength is about 30 Kg/mm$^2$ at the highest and is far from the satisfactory strength. However, it has been recently reported that AlN fibrous texture is formed by sintering a mixture of AlN with a small amount of $Y_2O_3$ and AlN sintered molding having a high mechanical strength.

However, it cannot be avoided in the above described various processes that the impurity of $Y_2O_3$ other than AlN is admixed in the obtained product in view of production as in $Si_3N_4$ sintered molding.

Accordingly, when $Si_3N_4$ or AlN sintered moldings produced in the above described processes (1) and (2) are used for a pipe, crucible and boat for producing highly pure metals, in the case of $Si_3N_4$ sintered molding, the oxides, such as MgO, $Al_2O_3$, $Y_2O_3$ used as the binder and like react with the metal at a high temperature and in the case of AlN sintered molding, the oxides, such as $Y_2O_3$ react with the metal at a high temperature and all the sintered moldings obtained by adding these oxides are poor in the thermal shock resistance, so that these sintered moldings added with these oxides are limited in the usable field.

An object of the present invention is to provide a method for producing metal nitride sintered moldings having a high strength and various excellent properties, such as heat resistance, corrosion resistance and thermal shock resistance, in which the previously known drawbacks of the metal nitride sintered moldings are obviated.

It has been found that metal nitride powders are mixed with at least one of the binders selected from the group consisting of the following organosilicon compounds, (1) compounds having only Si—C bond,
(2) compounds having Si—H bond in addition to Si—C bond,
(3) compounds having Si—Hal bond,
(4) compounds having Si—Si bond,
(5) compounds having Si—N bond, and
(6) organosilicon high molecular weight compounds, in which silicon and carbon are main skeleton components and which are produced through polycondensation reaction of at least one of the organosilicon compounds of the above described compounds (1)–(5), and
(7) Si—OR organoalkoxy (or aroxy) silanes,
(8) compounds having Si—OH bond,
(9) compounds having Si—O—Si bond,
(10) esters of organosilicon compounds, and
(11) peroxides of organosilicon compounds, molding the mixture into a desired shape and heating the formed molding under at least one atmosphere of vacuum, an inert gas, CO gas and hydrogen gas, whereby the above described organosilicon compounds and organosilicon high molecular weight compounds are thermally decomposed and volatile components are volatilized and the remaining carbon and silicon react to form SiC and the above described mixture can be sintered at a lower sintering temperature than that of the conventional production, and the present invention has been accomplished.

As the metal nitrides to be used in the present invention, mention may be made of $Si_3N_4$, AlN, HfN, TaN, ZrN, TiN, ScN, UN, ThN, NbN, VN, CrN, BN, $Be_3N_2$ and so on. The use of the metal nitrides having a fine grain size can lower the sintering temperature and the more dense sintered moldings can be obtained.

The binders to be used in the present invention include the above described organosilicon compounds (1)–(5) and the polycondensed organosilicon high molecular weight compounds having a molecular weight of 100–600,000. When the above described organosilicon compounds (1)–(5) or the organosilicon high molecular weight compounds are mixed with the metal nitrides and the resulting mixture is molded and then heated, the above described compounds are thermally decomposed and hydrogen, chlorine or a part of carbon is volatilized and the remaining carbon and silicon react at a temperature higher than about 1,250° C. to form SiC, so that when the sintered moldings are formed, SiC mainly remains other than $Si_3N_4$ and AlN. Organosilicon compounds containing oxygen other than the above described compounds (1)–(5) may be used for producing the sintered moldings, but in this case, a small amount of an oxide of silicon is formed, so that the properties of the sintered moldings may be deteriorated and in this case, the use of such sintered moldings is naturally limited.

The above described organosilicon compounds (1)–(5) capable of being used as the binder are exemplified as follows.

(1) Compounds having only Si—C bond:

Silahydrocarbons, such as $R_4Si$, $R_3Si(R'SiR_2)_nR'SiR_3$, carbon-functional derivatives thereof belong to this group.

For example,

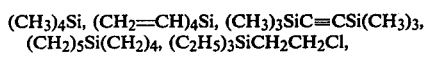

$(CH_3)_4Si$, $(CH_2=CH)_4Si$, $(CH_3)_3SiC\equiv CSi(CH_3)_3$, $(CH_2)_5Si(CH_2)_4$, $(C_2H_5)_3SiCH_2CH_2Cl$,

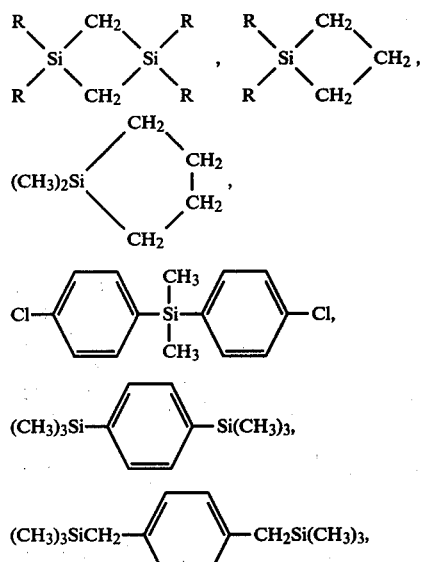

(2) Compounds having Si—H bond in addition to Si—C bond: Mono-, di-, and triorganosilanes belong to this group.

For example,

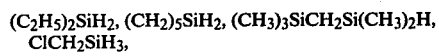

$(C_2H_5)_2SiH_2$, $(CH_2)_5SiH_2$, $(CH_3)_3SiCH_2Si(CH_3)_2H$, $ClCH_2SiH_3$,

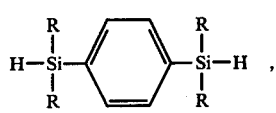

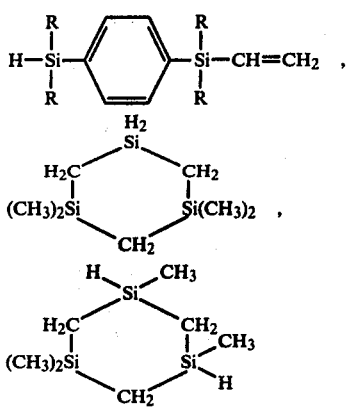

(3) Compounds having Si—Hal bond: Organohalogensilanes.

For example,

$CH_2=CHSiF_3$, $C_2H_5SiHCl_2$, $(CH_3)_2(ClCH_2)SiSi(CH_3)_2Cl$, $(C_6H_5)_3SiBr$,

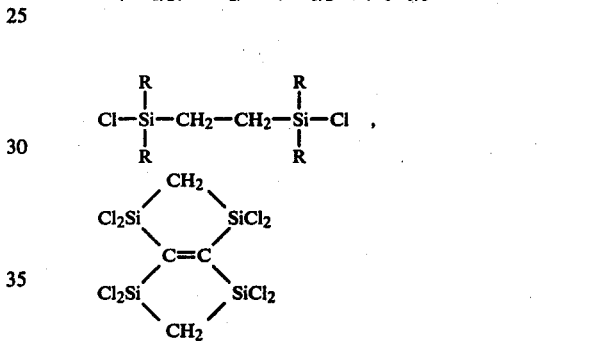

(4) Compounds having Si—Si bond:

For example,

$(CH_3)_3SiSi(CH_3)_2Cl$, $(C_6H_5)_3SiSi(C_6H_5)_2Si(C_6H_5)_3$,

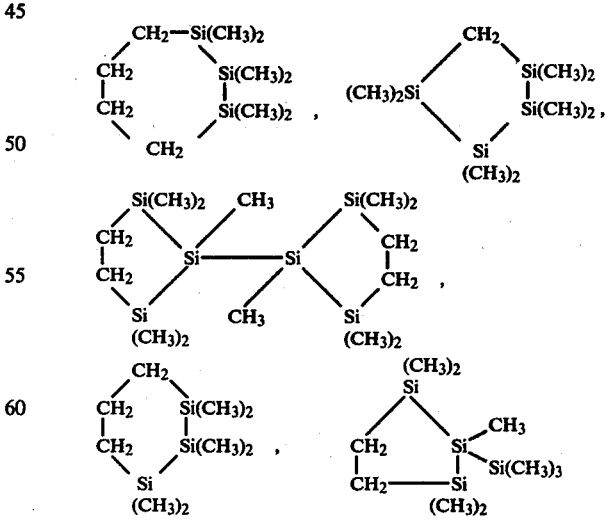

(5) Compounds having Si—N bond: Silylamines belong to this group.

For example,

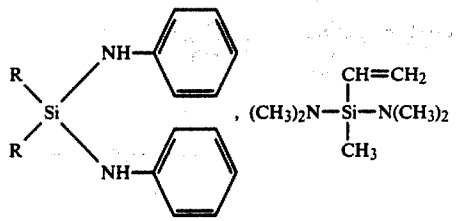, 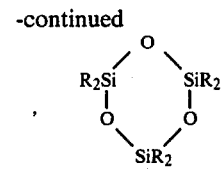

In the above formulae, R shows alkyl or aryl groups.

As the binders to be used in the method of the present invention, use may be made advantageously of the organosilicon compounds belonging to the above described groups (1)–(5) and organosilicon high molecular weight compounds obtained by polycondensation reaction of these organosilicon compounds and the following organosilicon compounds belonging to the groups (7)–(11) through irradiation, heating or addition of catalyst for the polycondensation following to the already known processes.

(7) Si—OR organoalkoxy (or aroxy) silanes:
For example, (CH$_3$)$_2$Si(OC$_2$H$_5$)$_2$, C$_2$H$_5$SiCl$_2$(OC$_2$H$_5$),
p-ClC$_6$H$_4$OSi(CH$_3$)$_3$,

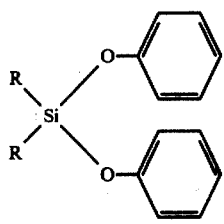

(8) Compounds having Si—OH bond: Organosilanes.
For example, (C$_2$H$_5$)$_3$SiOH, (CH$_3$)$_2$Si(OH)$_2$, C$_6$H$_5$Si(OH)$_3$,
(HO)(CH$_3$)$_2$SiCH$_2$Si(CH$_3$)$_2$.(OH),

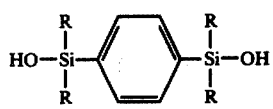

(9) Compounds having Si—O—Si bond: Organosiloxanes.
For example, (CH$_3$)$_3$SiOSi(CH$_3$)$_3$, HO(CH$_3$)$_2$SiOSi(CH$_3$)$_2$OH,
Cl$_2$(CH$_3$)SiOSi(CH$_3$)ClOSi(CH$_3$)Cl$_2$,
[(C$_6$H$_5$)$_2$SiO]$_4$,
CH$_2$=C(CH$_3$)CO$_2$CH$_2$Si.(CH$_3$)$_2$C-
H$_2$O$_2$C(CH$_3$)=CH$_2$

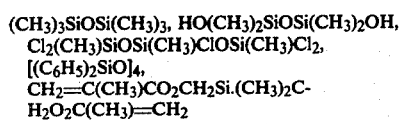

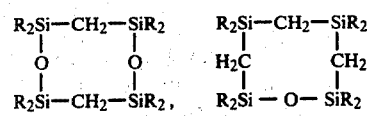

(10) Esters of organosilicon compounds: Esters formed from silanols and acids.

(CH$_3$)$_2$Si(OCOCH$_3$)$_2$

(11) Peroxides of organosilicon compounds:

(CH$_3$)$_3$SiOOC.(CH$_3$)$_3$, (CH$_3$)$_3$SiOOSi(CH$_3$)$_3$

In the above formulae, R shows alkyl or aryl groups.

From these starting materials are produced organosilicon high molecular weight compounds, in which silicon and carbon are the main skeleton components. For example, compounds having the following molecular structures are produced.

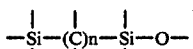 (a)

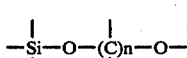 (b)

 (c)

(d) The compounds having the above described skeleton components (a)–(c) as at least one partial structure in linear, ring and three dimensional structures or mixtures of the compounds having the above described skeleton components (a)–(c).

The compounds having the above described molecular structures are, for example as follows.

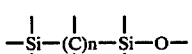 (a)

n=1, poly(silmethylenesiloxane),
n=2, poly(silethylenesiloxane),
n=6, poly(silphenylenesiloxane)

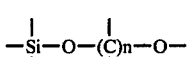 (b)

n=1, poly(methyleneoxysiloxane),
n=2, poly(ethyleneoxysiloxane),
n=6, poly(phenyleneoxysiloxane),
n=12, poly(diphenyleneoxysiloxane)

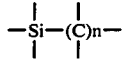

n=1, polysilmethylene,
n=2, polysilethylene,
n=3, polysiltrimethylene,
n=6, polysilphenylene,
n=12, polysildiphenylene (d) The compounds having the above described skeleton components as at least one partial structure in linear, ring and three dimensional structures or mixtures of the compounds having the above described skeleton components (a)-(c).

In the organosilicon high molecular weight compounds, in which silicon and carbon are the main skeleton components, even if silicon or carbon is present in the side chain, these elements are easily decomposed and volatilized, while silicon and carbon constituting the skeleton components are not easily decomposed and volatilized by heating and silicon and carbon bond at a high temperature to form SiC.

The production of the organosilicon high molecular weight compounds in which silicon and carbon are the main skeleton components from the starting materials of the organosilicon compounds belonging to the above described groups (1)-(5) and (7)-(11) can be effected by polycondensation attained by subjecting the organosilicon compounds belonging to the above described groups (1)-(5) and (7)-(11) to at least one of irradiation, heating and addition of a catalyst for the polycondensation.

For example, some well known reaction formulae for obtaining the above described organosilicon high molecular weight compounds from the above described starting materials belonging to the groups (1)-(5) and (7)-(11) through at least one of addition of the catalyst, irradiation and heating, are exemplified as follows.

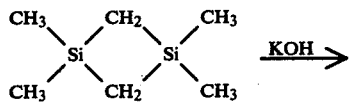 (1)

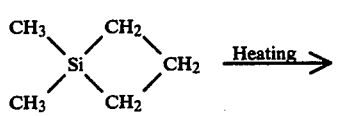 (2)

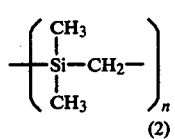

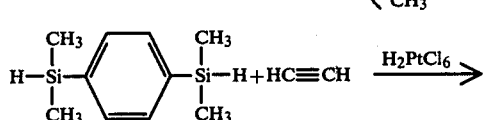

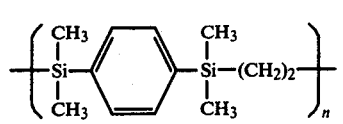

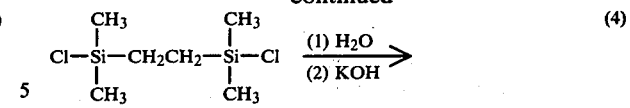 (4)

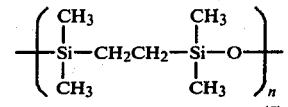 (5)

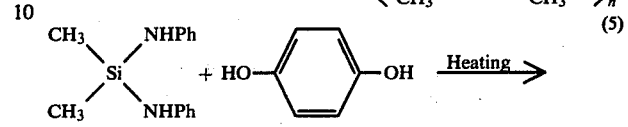

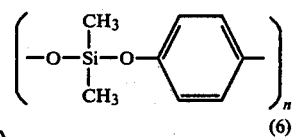 (6)

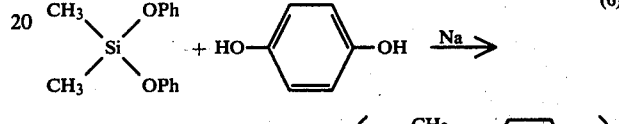

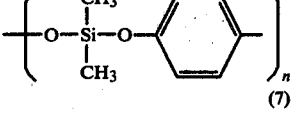 (7)

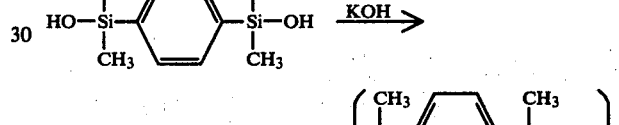

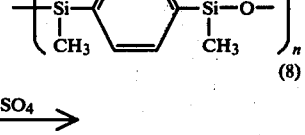 (8)

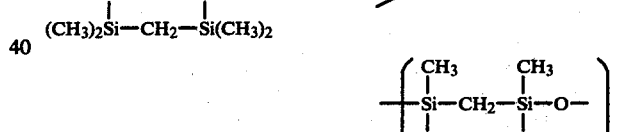

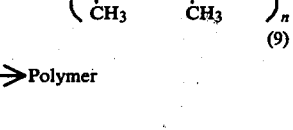 (9)

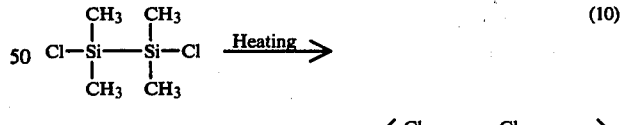 (10)

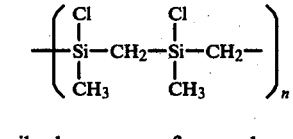

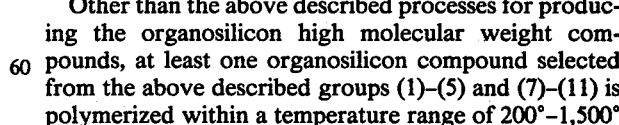

Other than the above described processes for producing the organosilicon high molecular weight compounds, at least one organosilicon compound selected from the above described groups (1)-(5) and (7)-(11) is polymerized within a temperature range of 200°-1,500° C. under vacuum, an inert gas, CO gas or hydrogen gas, if necessary, under pressure to produce the organosilicon high molecular weight compounds in which silicon and carbon are the main skeleton components.

The reason why the above described reaction should be effected within the temperature range of 200°-1,500°

C. is as follows. When the temperature is lower than 200° C., the synthesis reaction does not satisfactorily proceed, while when the temperature is higher than 1,500° C., the decomposition reaction is violent and the yield of the organosilicon high molecular weight compound becomes small, so that the temperature range must be 200° to 1,500° C. and best results can be obtained within the temperature range of 300°–1,200° C.

The above described synthesizing reaction can be carried out in a pressure vessel and in this case, the optimum temperature range is 350°–500° C. and upon the thermal decomposition polycondensation reaction of the organosilicon compound, a pressure is applied, so that it is not always necessary to apply a pressure. The above described polycondensation reaction may be effected by using a continuous apparatus. An explanation will be made with respect to one embodiment of the continuous production apparatus, which is shown in FIG. 4. The organosilicon compound is charged into a heating reaction column 2 through a valve 1 and in the reaction column, the organosilicon compound is heated at a temperature of 300°–1,500° C., preferably 500°–1,200° C. and a part of the reaction product of organosilicon high molecular weight compound is discharged from the reaction system through a valve 3 and low molecular weight compounds formed in the heating reaction column 2 are fed into a fractionating column 5 through a valve 4 and distillation and separation are effected therein and the formed gas is discharged from the fractionating column 5 through a valve 6 and the high molecular weight compound is taken out from the fractionating column 5 through a valve 7. The low molecular weight compounds separated in the fractionating column are recycled into the heating reaction column 2 through a valve 8.

The molecular structure of the thus obtained organosilicon high molecular weight compounds was tested by nuclear magnetic resonance absorption spectrum and infrared spectrum and the presence of +SI—C+ bond was recognized and it has been found that in the above described organosilicon high molecular weight compounds, the main skeleton components are constituted with silicon and carbon.

An explanation of process for using the binder will be made with respect to polycarbosilane which is easily produced among the binders and is smallest in decrease of weight after heat treatment and therefore can be advantageously used.

Polycarbosilane is liquid or solid and can be used directly or in a viscous solution obtained by dissolving the solid in a solvent, such as benzene, toluene, xylene, hexane, ether, tetrahydrofuran, dioxane, chloroform, methylene chloride, petroleum ether, petroleum benzine, ligroine, DMSO, DMF and other solvents capable of dissolving polycarbosilanes as a binder in the production of metal nitride sintered moldings. The binders other than polycarbosilane may be used following to the above described using process of polycarbosilane.

The binder is added in an amount of 0.3–45% by weight based on metal nitride powders. The added amount may be such an amount which needs for sintering metal nitrides and said amount can be adjusted by the molding and sintering processes as mentioned hereinafter. The resulting mixture is molded into a given shape. Alternatively, a hot press process wherein the mixture is heated in a mold and the press molding is effected in the course of sintering, may be used.

The sintering of the above described molding is effected by heating said molding at a temperature from 800° C. to 2,200° C. under at least one atmospheres of vacuum, inert gases, CO gas and hydrogen gas.

If the above described heat treatment is effected in air, the binder is oxidized to form $SiO_2$, so that the heat treatment is advantageously effected in at least one atmosphere of vacuum, inert gases, CO gas and hydrogen gas.

When by using the above described hot press, the firing is effected under a pressure of 70–20,000 $Kg/cm^2$ in at least one atmosphere of vacuum, inert gases, CO gas and hydrogen gas, the conversion of the binder into SiC can be increased and the metal nitride sintered moldings having higher strength can be formed. Furthermore, when the firing is effected under vacuum, if the heating temperature is raised by spending a sufficient time, the conversion of the binder into SiC is increased and the dense sintered moldings having much higher strength are obtained.

The hot press process to be used in the present invention is one process for sintering refractory substance powders and the powders are not previously molded and are heated in a mold and the press molding is effected in the course of sintering and the powders are more compactly packed and a dense molding can be obtained.

In the hot press process industrially carried out, the temperature is usually 1,500°–2,200° C. and the pressure is 100–700 $Kg/cm^2$. The heating of furnace is generally effected electrically by resistance heating process or high frequency induction heating process.

In the resistance heating, the voltage is continuously varied from 0 volt to 30 volts and as the current, an induction regulator of 15,000 amp is broadly applied and a resistance graphite tube for heating having a thickness of 1.3 cm, an outer diameter of 20 cm and a length of 150 cm is used. In the high frequency induction heating, 1,000–40,000 cycles per second can be used. In a small scale of hot press for producing a molding having a diameter of 2.5 cm and a length of 2.5 cm, 15 KVA at 30,000 cycles is preferable and in a large scale of molding having a diameter of 35 cm and a length of 25 cm, 300 KVA at 1,000 cycles is necessary.

The most simple press process is a lever type but this type is not convenient for adjusting the pressure. A ram type of oil pressure or air pressure is usually used.

If the mold is electrically conductive at a temperature of 1,500°–2,200° C. which is the press temperature, the heating can be directly made by a resistance or induction process, so that graphite is generally used. Graphite has many kinds but for the hot press, dense graphite having the highest strength and a high mechanical workability is suitable.

A detailed explanation will be made with respect to the course of sintering of metal nitrides upon the production of metal nitride sintered moldings. The organosilicon compounds and the organosilicon high molecular weight compounds used as the binder are thermally decomposed in the heat treatment and superfluous carbon and hydrogen volatilize and the remaining carbon and silicon mainly react to form SiC, which bonds strongly to the added metal nitride powders. In this course, when the temperature is gradually raised in a sufficiently long time, the organosilicon compound or the organosilicon high molecular weight compound fills the grain boundary of metal nitride powders and when the firing proceeds, the volatile components gradually volatilize and the remained components finally becomes SiC and the self sintering of the metal nitrides which are slow in the self diffusion, is promoted. In this case, the organosilicon compounds and the organosilicon high molecular weight compounds added as the binder are thermally decomposed at a relatively low temperature as shown in FIG. 1 and hydrogen, chlorine or a part of carbon volatilizes and the remaining carbon and silicon react and are completely converted into SiC at a temperature higher than about 1,250° C., so that even if the temperature for sintering metal nitrides is lower than that of the conventional metal nitride sintered moldings, the sintered moldings having a high strength, which are high in the oxidation resistance, corrosion resistance and thermal shock resistance, can be obtained and this is the great characteristic of the present invention. When the binder to be used in the present invention is converted into SiC, microcrystalline SiC is formed and the size of the crystal grain is usually 30-70 Å and the diameter of the crystal grain is far smaller than that of the heretofore known SiC sintered moldings, so that the surface area becomes considerably large and the apparent self diffusion coefficient of SiC becomes very large and in metal nitride sintered moldings of the present invention, the sintering ability is increased and as the result, sintered moldings having a high strength can be obtained.

Furthermore, the binder to be used in the present invention finally becomes SiC and this SiC has high oxidation resistance, corrosion resistance and the other desirable properties that SiC hardly reacts with metals and SiC is a more commercially advantageous binder than the oxides, such as MgO, $Al_2O_3$, $Y_2O_3$ and the like which are the binder for the metal nitrides heretofore used.

It is possible to obtain the sintered moldings having a higher strength by subjecting to the following treatment as described hereinafter to the sintered moldings obtained as described above. The above described sintered moldings subjected to the following treatment at least once. That is, the sintered moldings are impregnated with a liquid form of the above described organosilicon compounds or organosilicon high molecular weight compounds under a reduced pressure of 1 mmHg and the impregnated sintered moldings are heated at a temperature of 800°-2,200° C. under at least one of atmospheres of vacuum, an inert gas, hydrogen gas and CO gas. The above described organosilicon compounds or organosilicon high molecular weight compounds must be used in a liquid form, so that when these compounds are obtained in a liquid form, such organosilicon compounds or organosilicon high molecular weight compounds can be used directly or, if necessary, are dissolved in a small amount of benzene, toluene, xylene, hexane, ether, tetrahydrofuran, dioxane, chloroform, methylene chloride, petroleum ether, petroleum benzine, ligroin, DMSO, DMF and the other solvents which can dissolve said compounds, in order to lower the viscosity. when the organosilicon compounds or the organosilicon high molecular weight compounds not having a satisfactory fluidity are used, it is advantageous to use these compounds in a solution form dissolved in the above described solvents. As mentioned above, the above described organosilicon compounds include the low molecular weight compounds and the high molecular weight compounds obtained by the polycondensation of the low molecular weight compounds, but it is advantageous to use the high molecular weight compounds as the impregnating agent. Furthermore, by repeating the above described successive treatment at least one time, the sintered moldings having a fully high strength can be produced even if the sintering is effected at a relatively lower temperature than the usual sintering temperature.

For example, in $Si_3N_4$ sintered molding treated with 5 times of the above described impregnation, even if the sintering temperature is low as 1,100° C., the flexural strength becomes 20-40 $Kg/mm^2$. Moreover, the bulk density is low as 2.5-2.9 $g/cm^3$ and the weight is light but the flexural strength is large. This is one of the characteristics of the present invention. According to the conventional process, it has been usually impossible to obtain $Si_3N_4$ sintered molding at a temperature lower than 1,500° C. The sintered molding having the above described various properties can be obtained at a temperature lower than 1,500° C. only by the method of the present invention. Furthermore, $Si_3N_4$ sintered molding obtained by the present invention is not substantially varied in the size before and after firing, so that a high dimension preciseness can be obtained. Accordingly, even if the moldings having complicated shapes are fired, the dimension preciseness of the sintered moldings is substantially equal to that of the moldings which have not been fired and this is a noticeable characteristic of the present invention as compared with the conventional method for producing $Si_3N_4$ sintered molding.

The above described metal nitride sintered moldings may contain free carbon and this free carbon can be removed by firing the sintered moldings at a temperature of 800°-1,400° C. under an oxidizing atmosphere. Even if the above described firing is effected at a temperature lower than 800° C. carbon cannot be removed, while when the temperature exceeds 1,400° C., the oxidation reaction of the metal nitrides becomes excessive, so that such a high temperature is not preferable. The time of the above described firing under an oxidizing atmosphere varies depending upon the firing temperature, the size of the moldings and the structure of the firing furnace and when the firing temperature is low, the firing must be effected for a long time, while when the firing temperature is high, the firing time may be short, but when the firing is effected at a low temperature for a relatively long time, an amount of the metal oxide formed is small and a good result can be obtained. For example, when the crucible produced by the present invention is fired at a temperature of 1,000° C. in air to remove free carbon, the firing time is preferred to be 1-3 hours.

In the thus formed metal nitride sintered moldings, the binder is finally converted mainly into SiC, so that the metal nitride sintered moldings not containing impurities, such as MgO, $Al_2O_3$, $Y_2O_3$ and the like, which are contained in the metal nitride sintered moldings produced by the conventional production processes can be obtained. The metal nitride sintered moldings obtained in the present invention are more improved in the oxidation resistance, corrosion resistance and thermal shock resistance and are higher in the strength, even if the density is low, as compared with the conventional metal nitride sintered moldings.

In the present invention, an amount of the binder added is 0.3-45% by weight as mentioned above and when said amount is less than 0.3% by weight, it is difficult to obtain the metal nitride sintered moldings having a high strength, while when said amount is larger than 45% by weight, the bulk density is small and the strength decreases and the oxidation resistance lowers upon use at a high temperature, so that the amount must be 0.3–45%. When the hot press process is used, the amount of 1–10% by weight is preferable and in the process wherein the mixture of metal nitride powders and the binder is press molded and then the molded mixture is fired, the amount of 3–15% by weight is preferable.

$Si_3N_4$ sintered moldings obtained by the method of the present invention has a flexural strength of not less than 5 $Kg/mm^2$, a bulk density of not more than 3.05 $g/cm^3$, a high dimension preciseness and a high purity.

AlN sintered moldings obtained by the method of the present invention has a flexural strength of not less than 3 $Kg/mm^2$, a bulk density of not more than 3.0 $g/cm^3$, a high dimension preciseness and a high purity.

The present invention will be explained in more detail.

For a better understanding of the invention, reference is taken to the accompanying drawings, wherein.

The following examples are given for the purpose of illustration of this invention and are not intended as limitations thereof. In the examples, "%" and "parts" mean by weight unless otherwise indicated.

EXAMPLE 1

Figure 1:
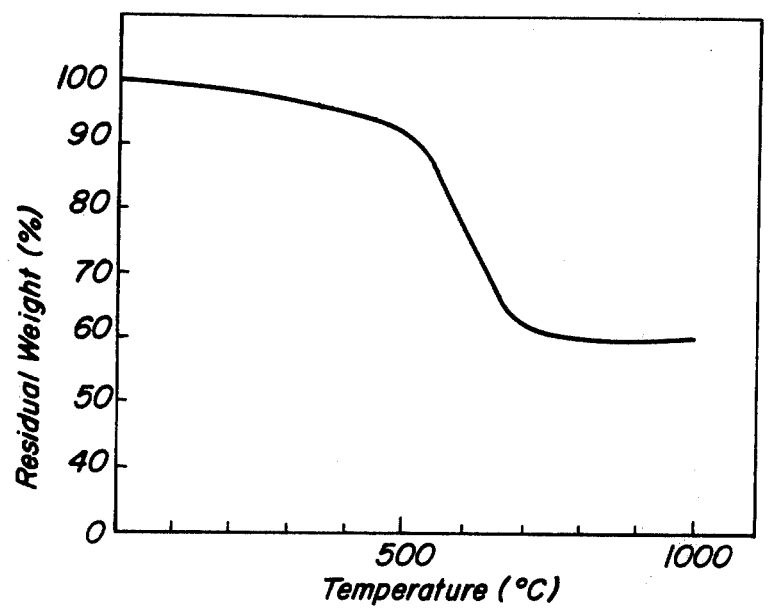
FIG. 1 is a graph showing a relation of the heating temperature under vacuum to the residual weight of polycarbosilane.
Figure 2:
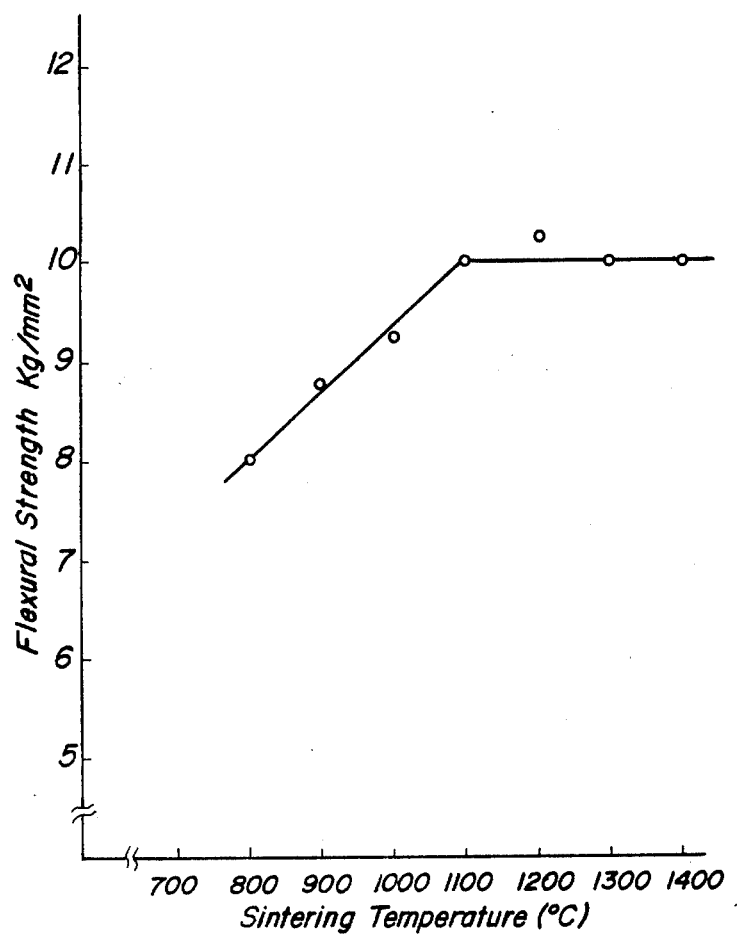
FIG. 2 is a graph showing a relation of the flexural strength to the sintering temperature of $Si_3N_4$ sintered moldings obtained by the method of the present invention.

Dodecamethylcyclohexasilane was heat treated in an autoclave at 400° C. for 36 hours under argon atmosphere to obtain a resinous polycarbosilane having an average molecular weight of 800. $Si_3N_4$ powders having a grain size of less than 350 meshes were thoroughly kneaded together with 10% by weight based on $Si_3N_4$ powders, of the above described polycarbosilane by using an appropriate amount of n-hexane and the resulting mixture was press molded into a prism of 10 mm×10 mm×30 mm under a pressure of about 2,000 $Kg/cm^2$ and said prism was heated at a temperature rasing rate of 100° C./hr under argon atmosphere, so that the temperature was kept at various temperatures within a range of 800°–1,400° C. for 1 hour respectively. A relation of the flexural strength of $Si_3N_4$ sintered moldings obtained at each heating temperature as described above to the sintering temperature is shown in FIG. 2. As seen from FIG. 2, the present invention can provide $Si_3N_4$ sintered molding having a satisfactory strength can be obtained at a relatively low temperature of 1,000° C.

EXAMPLE 2

Figure 3:
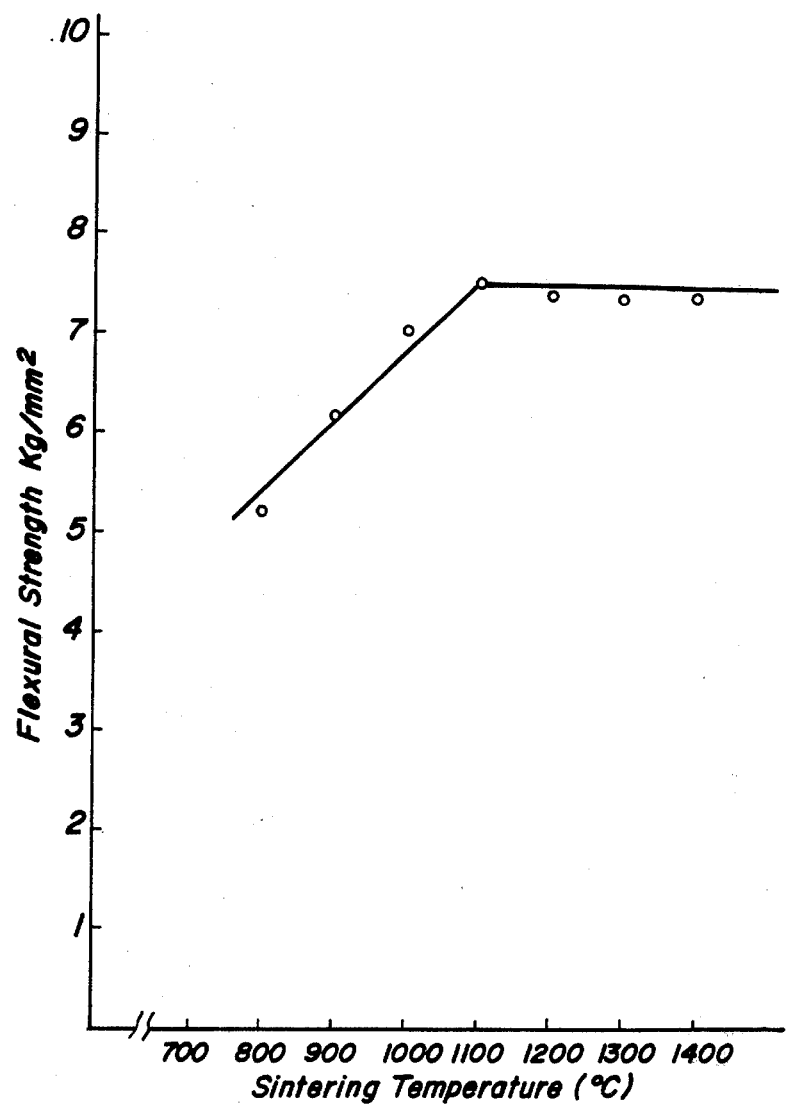
FIG. 3 is a graph showing a relation of the flexural strength to the sintering temperature of AlN sintered moldings obtained by the method of the present invention.

Dodecamethylcyclohexasilane was heat treated in an autoclave at 400° C. for 36 hours under argon atmosphere to obtain a resinous polycarbosilane having an average molecular weight of 800. AlN powders having a grain size of less than 350 meshes were thoroughly kneaded together with 10% by weight based on AlN powders of the above described polycarbosilane by using an appropriate amount of n-hexane and the mixture was press molded under a pressure of about 2,000 $Kg/cm^2$ into a prism of 10 mm×10 mm×30 mm and the formed prism was heated at a temperature raising rate of 100° C./hr under nitrogen gas, so that the temperature was kept at various temperatures within a range of 800°–1,400° C. for 1 hour respectively. A relation of the flexural strength to the sintering temperature of the resulting AlN sintered moldings is shown in FIG. 3. As seen from FIG. 3, the sintered molding having a satisfactory strength can be obtained at a low temperature as 1,100° C. according to the present invention.

EXAMPLE 3

Linear dimethylpolysilane produced from dimethyldichlorosilane was charged in an autoclave and heated at 410° C. for 32 hours in argon atmosphere under 30 atmospheric pressure to obtain polycarbosilane having an average molecular weight of 1,600. $Si_3N_4$ powders having an average grain size of $2\mu$ were kneaded together with 10% by weight based on $Si_3N_4$ powders of the above described polycarbosilane as a binder and the mixture was charged in a graphite mold in order to mold a prism of 10 mm×10 mm×30 mm and heated by a high frequency induction heating at a temperature raising rate of 300° C./hr under a pressure of 300 $Kg/cm^2$ under argon atmosphere by using a hot press, so that the temperature was kept at various temperatures within a range of 600°–1,600° C. for 0.5 hour respectively. Various properties of the obtained $Si_3N_4$ molding sintered at 1,500° C. are shown in the following Table 1.

Table 1

| Properties | Sample | $Si_3N_4$-10%MgO* (1,850° C. hot press) Conventional product | $Si_3N_4$—SiC Hot press Example 3 | $Si_3N_4$—SiC Sintered molding Example 5 |
|---|---|---|---|---|
| Bulk density ($g/cm^3$) | | 3.17 | 2.7–3.05 | 2.5–2.9 |
| Increased amount due to oxidation ($mg/cm^2$) | | | | |
| 1,000° C. | | 7.3 (50 hrs.) | 2.0 (50 hrs.) | 4.0 (50 hrs.) |
| 1,200° C. | | 5.2 (50 hrs.) | 2.0 (50 hrs.) | 4.0 (50 hrs.) |

Table 1-continued

| Properties | Sample | $Si_3N_4$-10%MgO* (1,850° C. hot press) Conventional product | $Si_3N_4$—SiC Hot press Example 3 | $Si_3N_4$—SiC Sintered molding Example 5 |
|---|---|---|---|---|
| Flexural strength (Kg/mm$^2$) | | 60–85 | 40–130 | 30–60 5 times of impregnation treatment |
| Young's modulus (Kg/mm$^2$) | | 2.8×10$^4$ | 4.1×10$^4$ | 3.1×10$^4$ |
| Thermal shock resistance (25° C. ⇌ 1,000° C.) rapid heating, quenching | | good | >1,000 times | >1,000 times |
| Corrosion resistance in fused Al | | good | very good | good |
| Alkali resistance amount of NH$_3$ generated in 25% NaOH | | small | very small | small |
| Hardness (Mohs) | | 9 | 9 | 9 |

*Values disclosed in published reference.

EXAMPLE 4

Linear dimethylpolysilane produced from dimethyldichlorosilane was charged in an autoclave and heated at 400° C. for 30 hours in argon atmosphere under 30 atmospheric pressures to produce polycarbosilane having an average molecular weight of 1,500. AlN powders having an average grain size of 2μ were kneaded together with 10% by weight based on AlN powders of the above described polycarbosilane as a binder. The resulting mixture was charged in a graphite mold for molding a prism of 10 mm×10 mm×30 mm and heated at a temperature raising rate of 300° C./hr. under a pressure of 300 Kg/cm$^2$ in argon atmosphere by means of a hot press, so that the temperature was kept at various temperatures within a range of 600°–1,700° C. for 0.5 hour respectively. Various properties of the obtained AlN moldings sintered at 1,500° C. are shown in the following Table 2.

Table 2

| Properties | Sample | AlN-20%Y$_2$O$_3$* (1,700° C. sintered molding Conventional product) | AlN—SiC (Hot press Example 4) | AlN—SiC (Press molded sintered molding Example 6) |
|---|---|---|---|---|
| Bulk density (g/cm$^3$) | | 3.26–3.50 | 2.75–3.10 | 2.6–2.9 |
| Increased amount due to oxidation (mg/cm$^2$) 1,000° C. 1,100° C. | | 0.20 (72 hrs.) 0.50 (72 hrs.) | 0.5 (50 hrs.) 1.0 (50 hrs.) | 1.0 (50 hrs.) 2.0 (50 hrs.) |
| Flexural strength (Kg/mm$^2$) | | 30–70 | 15–80 | 30–50 (5 times of impregnation treatment) |
| Young's modulus (Kg/mm$^2$) | | 3.1×10$^4$ | 4.0×10$^4$ | 3.5×10$^4$ |
| Thermal expansion coefficient (×10$^6$/°C.) 25°–1,000° C. | | 5.70 | 4.86 | 5.54 |
| Thermal shock resistance (25° C. ⇌ 1,100° C.) rapid heating, quenching | | good | >1,000 times | >1,000 times |
| Corrosion resistance in fused Al | | good | very good | good |
| Hardness (Mohs) | | 7 | 7–8 | 7–8 |

*Values disclosed in published reference.

As seen from the above Table 2, the sintered moldings having substantially the same density as the theoretical value can be obtained even at a low temperature as 1,500° C. according to the present invention.

EXAMPLE 5

Figure 5:
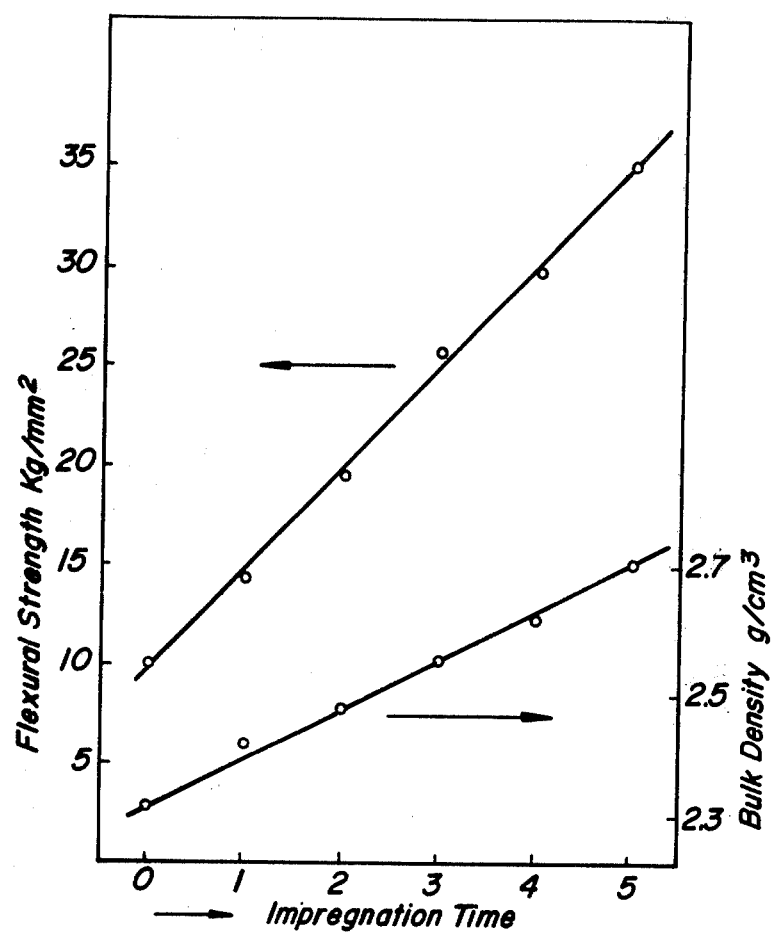
FIG. 5 is a graph showing a relation of the impregnation time to the flexural strength and the bulk density of $Si_3N_4$ sintered moldings obtained by the method of the present invention.

To the $Si_3N_4$ sintered molding obtained by sintering at 1,100° C. in Example 1 and having a bulk density of 2.31 g/cm$^3$ was poured a solution of 20 cc of liquid polycarbosilane added with 10 cc of toluene under vacuum to impregnate the sintered molding with said solution. The impregnated sintered molding was heated to 1,100° C. under argon atmosphere in 8 hours to obtain a new sintered molding. The bulk density of this Si₃N₄ sintered molding was 2.41 g/cm³. This sintered molding was subjected to the successive treatments of impregnating and heating steps under the same condition as described above. The bulk density of the obtained sintered molding became 2.48 g/cm³. Additionally, when the thus formed sintered molding was subjected to said successive treatment under the same condition as described above, the bulk density of the sintered molding became 2.54 g/cm³. By repeating the impregnating and heating steps as mentioned above, the sintered molding having a high strength can be obtained even at a low sintering temperature. A relation of the impregnation time to the flexural strength and the bulk density of the sintered moldings obtained in this example is shown in FIG. 5.

EXAMPLE 6

Figure 6:
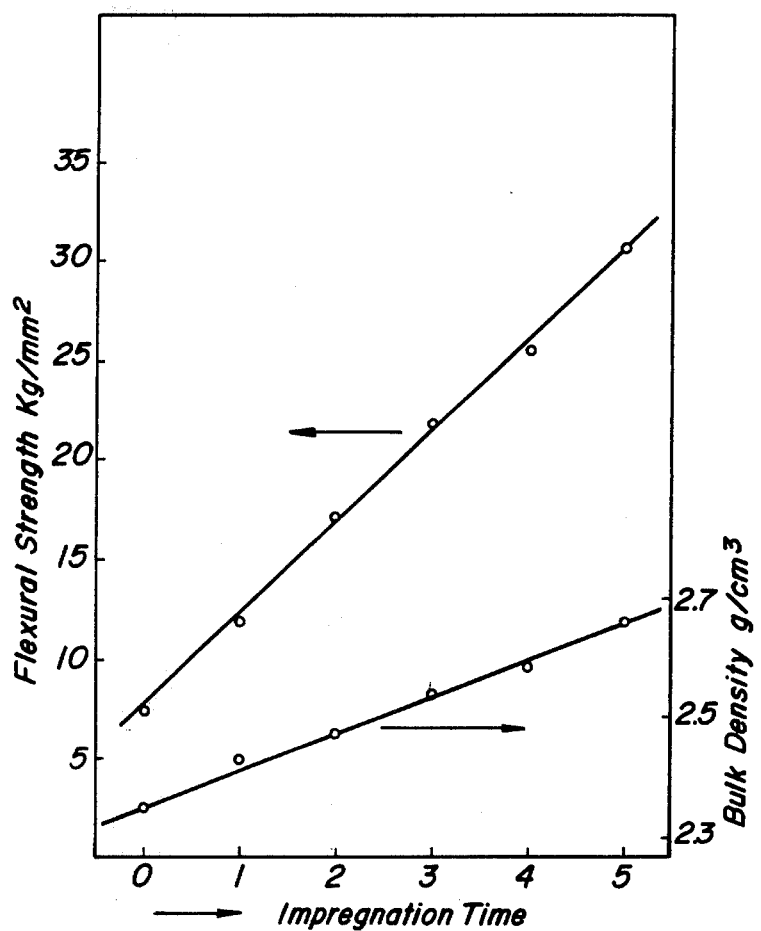
FIG. 6 is a graph showing a relation of the impregnation time to the flexural strength and the bulk density of AlN sintered moldings obtained by the method of the present invention.

AlN sintered molding obtained by sintering at 1,100° C. in Example 2 was charged in an autoclave together with the polycarbosilane and the pressure in the autoclave was reduced and then a pressure was applied with nitrogen gas while heating to 400° C. to impregnate the sintered molding with the polycarbosilane and then the impregnated sintered molding was heated to 1,100° C. in 8 hours under nitrogen atmosphere to obtain a new sintered molding. The above described impregnating and heating steps were repeated. A relation of the impregnation time to the flexural strength and the bulk density of the sintered moldings obtained in this example is shown in FIG. 6.

EXAMPLE 7

A solution of 3 g of octaphenyltrisilane [(C₆H₅)₃SiSi(C₆H₅)₂Si(C₆H₅)₃] dissolved in benzene and 30 g of Si₃N₄ powders having 350 meshes were thoroughly kneaded and the resulting mixture was press molded into a prism of 10 mm×10 mm×30 mm under a pressure of 1,000 Kg/cm² and the formed molding was heated to 1,300° C. at a temperature raising rate of 100° C./hr. under nitrogen atmosphere to obtain a sintered molding having a bulk density of 2.25 g/cm³. The obtained sintered molding was heated at 900° C. in air for 3 hours. The thus obtained Si₃N₄ sintered molding had a free carbon content of less than 0.2% and the bulk density was 2.27 g/cm³. The flexural strength of the sintered molding was 6.3 Kg/mm².

EXAMPLE 8

A solution of 4 g of p-bis(dimethylvinylsilyl) benzene [CH₂=CHSi(CH₃)₂C₆H₄Si(CH₃)₂CH=CH₂] dissolved in xylene and 30 g of AlN powders having a grain size of less than 350 meshes were thoroughly kneaded and the resulting mixture was press molded into a prism of 10 mm×10 mm×30 mm under a pressure of 700 Kg/cm² and the formed molding was heated to 1,200° C. under nitrogen atmosphere in 12 hours. The formed sintered molding had a bulk density of 2.30 g/cm³ and a flexural strength of 6.4 Kg/mm².

EXAMPLE 9 p-bis(oxydimethylsilyl)benzene

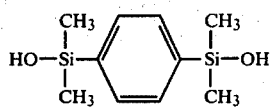

was heated and polymerized in the presence of a catalyst of potassium hydroxide to form organosilicon high molecular weight compound having an average molecular weight of 5,000. A solution of 4 g of the formed organosilicon high molecular weight compound dissolved in benzene and 500 g of Si₃N₄ powders having a grain size of less than 350 meshes were thoroughly kneaded and the resulting mixture was press molded into a prism of 10 mm×10 mm×30 mm under a pressure of 700 Kg/cm² and then the formed molding was heated at a temperature raising rate of 100° C./hr to 1,400° C. under argon atmosphere to obtain a sintered molding having a bulk density of 2.20 g/cm³. The formed Si₃N₄ sintered molding was charged in an autoclave together with the above described organosilicon high molecular weight compound and the pressure in the autoclave was reduced and then heated at 400° C. until 15 atmospheric pressure to impregnate the sintered molding with the organosilicon high molecular weight compound and then the impregnated sintered molding was heated at a temperature raising rate of 100° C./hr. to 1,400° C. under argon atmosphere. The obtained sintered molding had a bulk density of 2.35 g/cm³ and a flexural strength of 11 Kg/mm².

EXAMPLE 10

Figure 4:
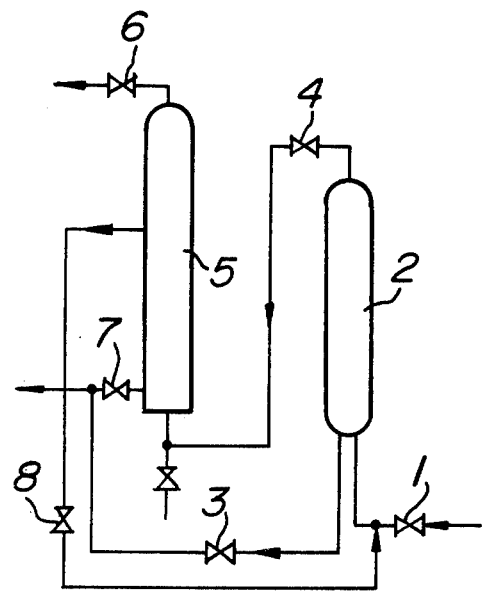
FIG. 4 show a diagram of an apparatus for polycondensing the organosilicon compounds to form the organosilicon high molecular weight compounds.

A mixture of about 78% of dimethyldichlorisilane, about 8% of methyltrichlorosilane, about 3% of trimethylchlorosilane and about 2% of methyldichlorosilane directly synthesized from methylchloride and metallic silicon was polycondensed by using an apparatus as shown in FIG. 4.

The above described mixture was fed together with argon into a reaction column 2 heated at 750° C. at a feeding rate of 1 l/hr. the fed starting materials were subjected to decomposition reaction and polycondensation reaction in the reaction column 2 to form a high molecular weight compound and simultaneously form a low molecular weight compound. A part of the formed high molecular weight polymer may be taken out from the reaction column 2 but a major part of the high molecular weight compound was introduced into a fractionating column 5 together with the low molecular weight compound, wherein the high molecular weight compound was separated from gas and low molecular weight compound. The low molecular weight compound was again fed into the reaction column 2 and reused as the starting material. The yield of the thus obtained high molecular weight compound was 19% and the average molecular weight was 1,800. Said high molecular weight compound obtained in a liquid form was directly thoroughly kneaded together with Si₃N₄ powders having a grain size of less than 350 meshes under nitrogen atmosphere in such an amount that 10% by weight of the liquid high molecular weight compound was contained in Si₃N₄ powders. The resulting mixture was press molded into a prism of 10 mm×10 mm×30 mm under a pressure of 1,000 Kg/cm². The formed molding was heated to 1,400° C. at a temperature raising rate of 100° C./hr. to obtain a sintered molding having a bulk density of 2.25 g/cm$^3$ and a flexural strength of 8 Kg/mm$^2$.

Although some examples are shown in the above described examples with respect to typical Si$_3$N$_4$ and AlN among well known nitrides, the other metal nitrides can provide the metal nitride sintered moldings having the excellent properties as explained in Si$_3$N$_4$ and AlN sintered moldings according to the method of the present invention.

Thus, the present invention can provide a method for producing sintered moldings having excellent mechanical strength, heat resistance, oxidation resistance, corrosion resistance and thermal shock resistance at a lower sintering temperature than that of the conventional processes by using the organosilicon compounds or the organosilicon high molecular weight compounds as the binder of the nitrides and the nitride sintered moldings obtained by the present invention can develop the high properties even in many fields in which high heat resistance, oxidation resistance, corrosion resistance and mechanical strength as well as all the field where nitride sintered moldings have been already used, for example, fusing crucibles, blast furnace material, various pipes, various nozzles, turbine blade, a variety of engine parts, coating materials, nuclear reactor materials.

What is claimed is:

1. A method for producing metal nitride sintered moldings, which comprises mixing metal nitride powders with 0.3–45 percent by weight of a binder consisting essentially of organosilicon high molecular weight compounds having silicon and carbon as the main skeleton components, which have been produced through polycondensation reaction of polydimethylsilanes, molding the resulting mixture into a desired shape and heating the molding at a temperature of 800°–2200° C. under at least one atmosphere selected from the group consisting of vacuum, inert gas, CO gas and hydrogen gas to form metal nitride sintered molding.

2. The method as claimed in claim 1 wherein the formed metal nitride sintered molding is heated at a temperature of 800°–1,400° C. under an oxidizing atmosphere to remove free carbon contained in the metal nitride sintered molding.

3. The method as claimed in claim 1, wherein the mixture of metal nitride powders and the binder is press molded by a hot press process, during which sintering is effected.

4. The method as claimed in claim 1, wherein the formed metal nitride sintered molding is impregnated with a liquid form of the organosilicon high molecular weight compound under a reduced pressure and then the impregnated metal nitride sintered molding is heated under at least one atmosphere of vacuum, an inert gas, CO gas and hydrogen gas.

5. The method as claimed in claim 4, wherein the successive treatment of the impregnation and the heating is repeated two or more times.

6. The method as claimed in claim 4, wherein the liquid form of the organosilicon compound or organosilicon high molecular weight compound is formed by dissolving said compound in a solvent.

7. The method as claimed in claim 1, wherein said metal nitride is Si$_3$N$_4$ or AlN.

* * * * *